No. 749,934. PATENTED JAN. 19, 1904.
B. K. HOLLISTER.
LIGATURE TUBE.
APPLICATION FILED MAR. 17, 1900.
NO MODEL.
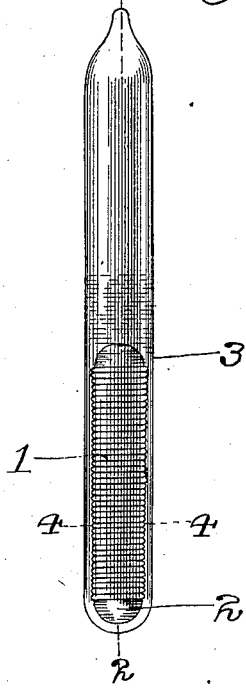
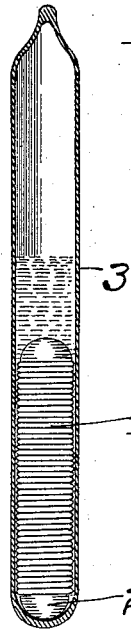
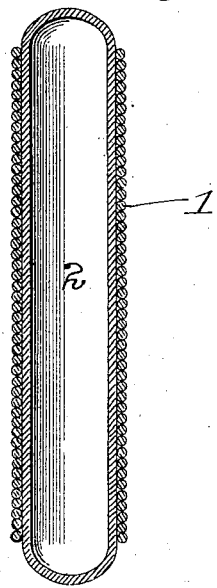
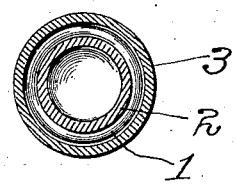
Witnesses:
Inventor:
Bertram K. Hollister,
By Coburn, Hibben & McElroy
Attys No. 749,934. Patented January 19, 1904.

UNITED STATES PATENT OFFICE.

BERTRAM K. HOLLISTER, OF CHICAGO, ILLINOIS, ASSIGNOR TO BAUER & BLACK, OF CHICAGO, ILLINOIS, A CORPORATION OF ILLINOIS.

LIGATURE-TUBE.

SPECIFICATION forming part of Letters Patent No. 749,934, dated January 19, 1904.

Application filed March 17, 1900. Serial No. 9,020. (No model.)

*To all whom it may concern:*

Be it known that I, BERTRAM K. HOLLISTER, a resident of Chicago, in the county of Cook and State of Illinois, have invented certain new and useful Improvements in Ligature-Tubes, of which the following is a specification.

My invention relates to what are known in the art as "ligature-tubes" for aseptic surgical ligatures and the like, in which the ligature is carried by or wound upon a tube or other support contained within a closed or sealed outer tube partially filled with a liquid which is aseptic and antiseptic, such as alcohol, so that the ligature will be preserved in a wet state.

The object of my invention is to avoid the liability of breakage of the outer tube by reason of violent contact or blow of the inner tube or support when the tube or holder is reversed or shaken; and to this end I provide for cushioning the movement of the ligature support or tube.

In the drawings, Figure 1 represents a full-sized view in elevation of my ligature-tube; Fig. 2, a central sectional elevation thereof on line 2 2 of Fig. 1; Fig. 3, an enlarged section of the inner tube and its ligature, and Fig. 4 an enlarged section on line 4 4 of Fig. 1.

The surgical ligature 1, whether of silk, catgut, or the like, is wound upon or secured to a tube 2, hereinafter designated as the "inner" tube, which is preferably of glass and cylindrical. As shown, the ends of the tube are closed. The outer tube 3, which may be considerably longer than the inner tube, is also preferably of glass and is of slightly larger diameter than the inner tube and its ligature. This outer tube contains a sufficient amount of alcohol or the like to preserve the ligature in a wet state, and after the insertion of the inner tube and after the solution, usually alcohol, is introduced the outer tube is closed or hermetically sealed. It is to be understood that the tubes and the ligature have been previously sterilized in the usual and well-known manner.

When the tube is reversed or shaken, the inner tube cannot drop suddenly against the end of the outer tube, but will descend slowly because it is cushioned. The inner tube being closed and of slightly less diameter than the outer tube, the liquid must pass up alongside in the narrow annular space between itself and the outer tube, and evidently the inner tube cannot move faster than the liquid is permitted to pass by. Consequently the inner tube is cushioned in its movements, and there is no liability of the sudden dropping of the inner tube, so as to break the ends of the outer tube. If the inner tube was an open tube, the liquid would find free passage therethrough, and obviously my object would not be attained. My ligature support or tube thus prevents the passage of the liquid through itself, but permits it to pass up on the outside. Consequently any ligature support or body having these characteristic features is within the scope of my invention and claims, and consequently what is designated herein as a "closed" tube is simply a body through which no passage is provided. My tube when constructed as shown also has the advantage over an open tube of requiring less alcohol to accomplish the same purposes.

It is apparent that modifications may be made in the particular formation of the ligature support or tube; but so long as it accomplishes the object of retarding or preventing any rapid movement of the tube through the liquid it is understood as included within the scope and meaning of my invention and claims.

I claim—

1. A ligature tube or receptacle comprising an outer closed tube containing a liquid and a ligature-support movable therein from end to end and of slightly less diameter than the tube and closed to the passage of the liquid through itself, but permitting the liquid to pass alongside, whereby the support is cushioned in its movements.

2. A ligature-tube comprising an outer closed tube containing a liquid, and a closed inner tube therein around which the ligature is wound.

3. A ligature-tube comprising an outer closed tube containing a liquid, and a hollow tube closed at its ends and movable within the outer tube, such inner tube carrying the ligature and of slightly less diameter than the outer tube.

4. The combination of an outer sealed tube and an inner closed tube movable comparatively freely therein from end to end and on the outside of which the ligature is wound, such inner tube being substantially cylindrical and being, together with its ligature, slightly less in diameter than the inner diameter of the outer tube, whereby the movements of the inner tube from end to end of the outer tube are cushioned.

BERTRAM K. HOLLISTER.

Witnesses:
LEON PROUX,
SAMUEL E. HIBBEN.